L. L. KELLOGG.
AUTOMOBILE LIFTER.
APPLICATION FILED NOV. 4, 1919.

1,392,338.

Patented Oct. 4, 1921.
2 SHEETS—SHEET 1.

Inventor
L. L. Kellogg
By C. A. Snow & Co.
Attorneys

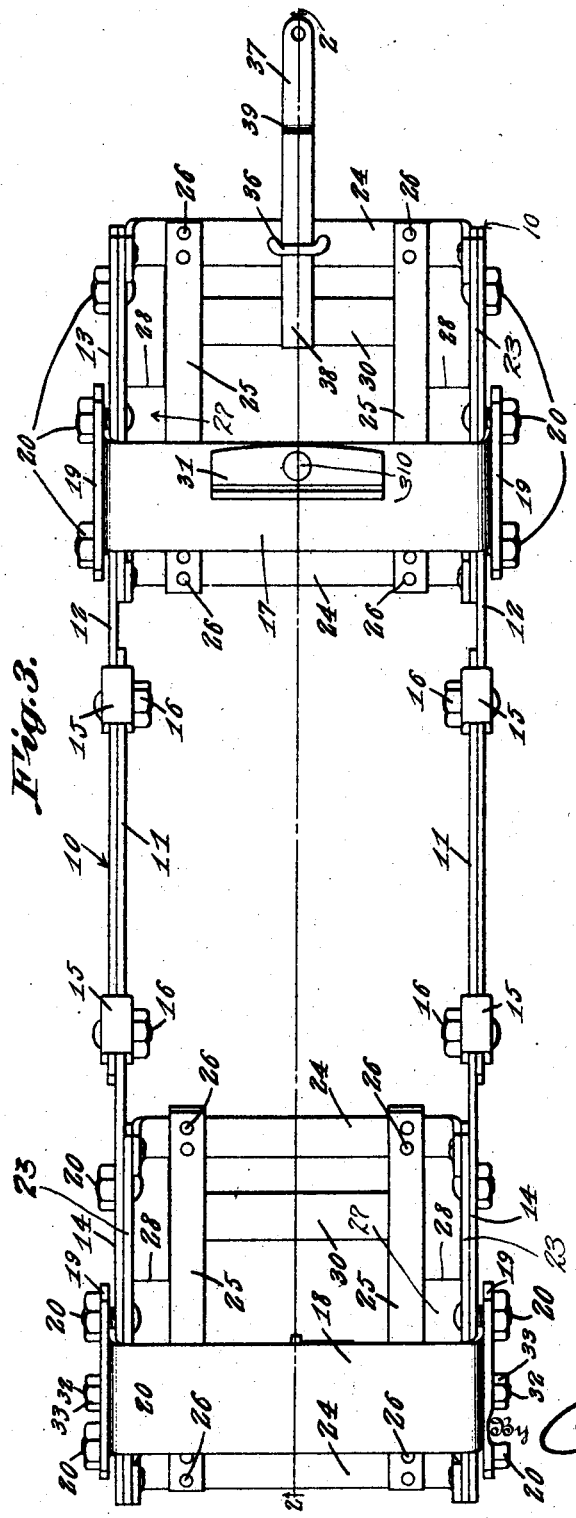
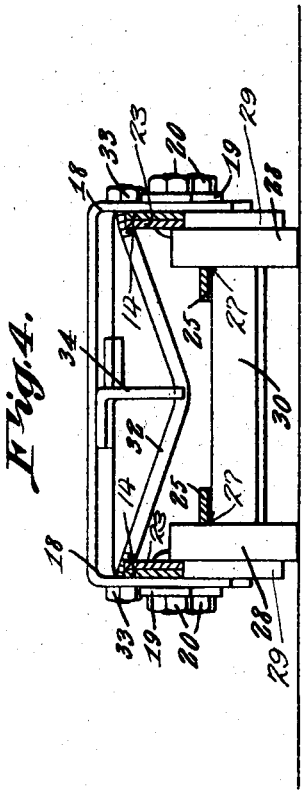

UNITED STATES PATENT OFFICE.

LUKE L. KELLOGG, OF FREDONIA, NEW YORK.

AUTOMOBILE-LIFTER.

1,392,338.  Specification of Letters Patent.  Patented Oct. 4, 1921.

Application filed November 4, 1919. Serial No. 335,573.

*To all whom it may concern:*

Be it known that I, LUKE L. KELLOGG, a citizen of the United States, residing at Fredonia, in the county of Chautauqua and State of New York, have invented a new and useful Automobile-Lifter, of which the following is a specification.

This invention aims to provide novel means whereby, when the frame of a lifter or jack is advanced by contact with an automobile driven thereover, the frame will be elevated and be held elevated, it being possible to release the frame, to the end that the frame may move automatically to a lowered position.

The invention consists of a frame supported from roller elements, which frame is adapted to be automatically elevated when rolled in one direction upon the elements and lowered when rolled in the opposite direction, with means on the frame for engaging the front and rear axles of an automobile, and mechanisms for adjusting the height of the engaging means from the frame to engage properly with cars of different makes. The invention also contemplates a brake to limit both the forward and backward movement of the frame upon the roller elements. Guiding means for maintaining the roller elements in a true transverse position with relation to the frame; and an automatic mechanism for locking the frame in elevated position upon the roller elements together with a manually operated release therefor. To this end I have illustrated and described herein the best embodiment of my invention of which I am at present informed.

In the accompanying drawings:

Fig. 3 is a plan view of the device; and

Fig. 4 is a vertical transverse sectional view taken on the line 4—4 of Fig. 1.

Figure 1:
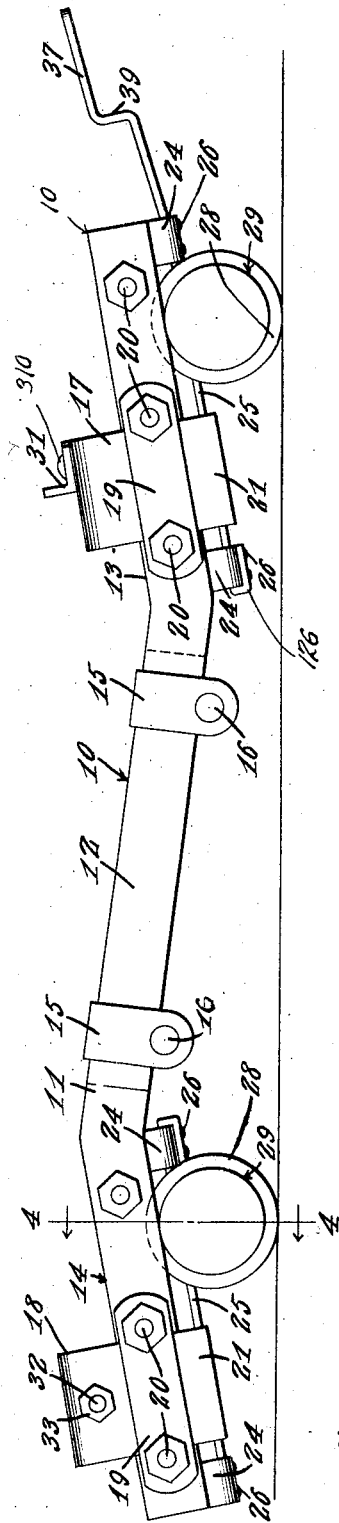
Figure 1 is a side elevation of my improved automobile lifter, the frame being lowered.

My improved automobile lifter or jack is shown as embodying a frame 10 comprising side strips 11 and 12, the forward portions 13 of the strips 12 being inclined upwardly and the rear portions 14 of the strips 11 being inclined upwardly, said strips being in substantially parallel relation and including intermediate forwardly inclined portions as shown. The intermediate portions of the strips 11 and 12 are disposed in overlapping relation, and are adjustably connected as through the medium of U-shaped clamps 15, the lower jaws of which are united by bolts 16, thus providing means for adjusting the length of the device to suit automobiles of different sizes.

Bunkers 17 and 18 are provided, the same consisting of inverted U-shaped metallic strips having their ends extended downwardly across the outer surfaces of the strips 11 and 12. The bunkers are adapted for vertical adjustment, to suit different automobiles. For this purpose, clamping plates 19 are secured at spaced points near the ends thereof, to the side strips 11 and 12 by bolts 20, the end portions 21 of the bunkers 17 and 18 extending between the side strips 11 and 12 and the clamping plates 19.

The inclined front portions and rear portions of the frame of the device, are provided with cradles 22 comprising side strips 23 secured by the bolts 20 to the inner faces of the side strips 11 and 12 and connected at their ends by U-shaped brace members 24. The bottom portions of the transverse brace members 24 are connected by longitudinal strips 25 disposed near the side strips 11 and 12, the ends of the strips 25 being bolted at 26 to the parts 24, the inner ends of the strips 25 being bent around and beneath certain of the transverse frame members as shown at 126, so as to prevent longitudinal displacement of the strips 25.

The side strips 23 and the parts 25 form slots 27 adapted to receive the bodies of wheels 28. The parts 13, 14 and 23 of the frame rest upon the hubs 29 of the wheels. The wheels are connected by integral axles 30.

Upon the top portion of the forward bunker 17, a bar 31 is pivoted at 310 so as to permit the automobile to adjust itself to the frame of the lifter when the front axle strikes the pivotal push bar or bumper 31. The rear bunker 18 is reinforced by means of a truss rod 32 having its ends threaded to receive nuts 33 engaging the depending ends of the bunker, the intermediate portion of the truss rod coöperating with a strut 34 extending downwardly from the part 18 as clearly shown in Fig. 4 of the drawings.

Figure 2:
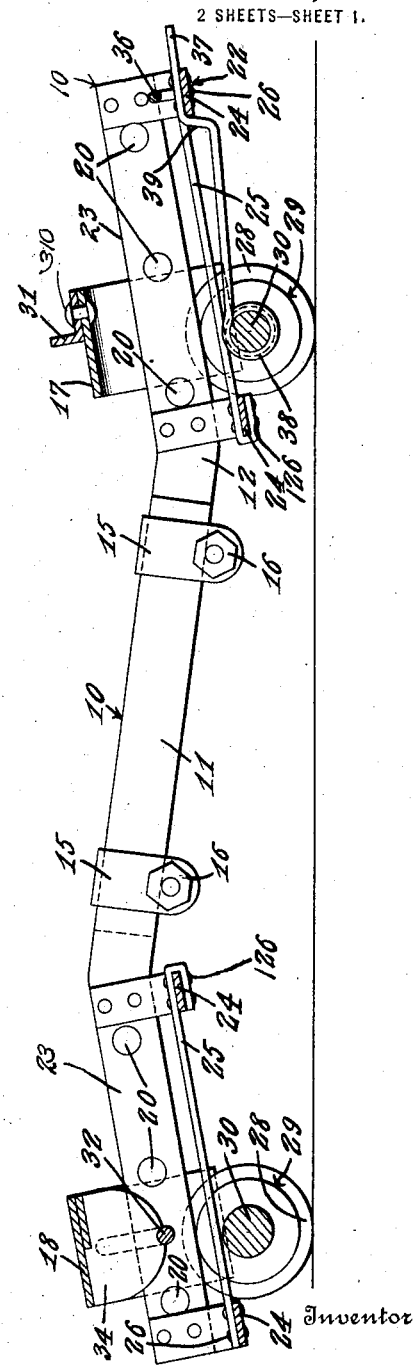
Fig. 2 is a central longitudinal sectional view taken on the line 2—2 of Fig. 3, the frame being raised.

The foremost member 24 is provided with a guide loop 36 receiving a tongue 37, the rear portion of which is pivoted to a reduced portion of the front axle by means of a collar 38. The forward end of the tongue 37 is offset to form a shoulder 39 adapted to engage the front transverse frame member 24, when the automobile has been driven upon the lifter to cause the front axle of the automobile to engage the push bar 31, the rear axle casing resting upon the bunker 18 and the front axle resting upon the bunker 17. The frame of the lifter thus will be carried forwardly on the wheels 28 and the inclined portions 13 and 14 will be raised as the frame moves forwardly. By reason of the engagement of the wheels 28 in the slots 27 displacement of the frame from the wheels will be prevented. When the wheels 28 engage the rear transverse frame members 24, they will act as a brake, to check the forward movement of the device and the machine which is supported thereon. When the frame has moved from the position shown in Fig. 1 of the drawings to the position shown in Fig. 2 of the drawings, the tongue 37 will drop and the shoulder 39 will engage behind the cross bar 24 at the front of the frame, thereby holding the automobile in an elevated position. By lifting the tongue 37, the device will automatically return to the position shown in Fig. 1, and the wheels of the car will be lowered to the ground.

Having thus described the invention what I claim is:

1. An automobile lifter comprising side portions having ends which are inclined in the direction of approach thereto, cradles connecting said ends and providing side slots at the bottom thereof, and transverse frame members, supporting wheels arranged in pairs, and upon the peripheries of which said side portions of the frame rest, said wheels extending into said slots, vertically adjustable bunkers carried by said side portions, said wheels being designed to engage said transverse members to check the movement of the frame on the wheels, and means at the front of the wheels and at the forward portion of the frame to prevent retrograde movement of the frame on the wheels.

2. An automobile lifter comprising a frame having side portions, the front and rear ends of said side portions being inclined rearwardly, said side portions being disposed in overlapping relation, clamps engaged on the overlapping portions and adapted to hold the frame in any position of longitudinal adjustment to vary the length thereof, cradles at the front portions of the frame, braces for said cradles, inverted U-shaped bunkers attached to said side portions and extending above and between said side portions of the frame, wheels arranged in pairs and having connecting axles, said side portions of the frame resting on said wheels at said inclined portions and the cradles, a push bar carried by one of said bunkers, said cradles having transverse portions designed to engage the peripheries of the wheels to form brakes to check the movement of the frame on the wheels when a car is driven over the device and in contact with the push bar, a tongue pivoted to one of the axles and having slidable engagement with one of the transverse portions of one of the cradles and provided with a shoulder adapted to engage said transverse portion to hold said frame from movement downwardly after being elevated on the wheels.

In testimony that I claim the foregoing as my own, I have hereto affixed my signature in the presence of two witnesses.

LUKE L. KELLOGG.

Witnesses:
W. A. JUDSON,
DE FOREST STRAIGHT.